(12) United States Patent
Kawanishi et al.

(10) Patent No.: US 8,964,197 B2
(45) Date of Patent: Feb. 24, 2015

(54) READING APPARATUS AND READING CONTROL METHOD THAT REDUCES MISALIGNMENT AT A JOINT BETWEEN A PIXEL READ BEFORE A READ-SUSPENSION EVENT AND A PIXEL READ AFTER THE READ-SUSPENSION EVENT

(71) Applicant: Canon Kabushiki Kaisha, Tokyo (JP)

(72) Inventors: Masahiro Kawanishi, Yokohama (JP); Takashi Awai, Chiba (JP); Tadashi Hanabusa, Yokohama (JP); Akihiro Tomoda, Yokohama (JP); Haruo Ishizuka, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/753,230

(22) Filed: Jan. 29, 2013

(65) Prior Publication Data

US 2013/0194600 A1 Aug. 1, 2013

(30) Foreign Application Priority Data

Jan. 31, 2012 (JP) ................................. 2012-018918

(51) Int. Cl.
| | |
|---|---|
| *G06F 3/12* | (2006.01) |
| *H04N 1/04* | (2006.01) |
| *H04N 1/00* | (2006.01) |
| *H04N 1/047* | (2006.01) |
| *H04N 1/12* | (2006.01) |

(52) U.S. Cl.
CPC ......... *H04N 1/00915* (2013.01); *H04N 1/0473* (2013.01); *H04N 1/12* (2013.01); *H04N 2201/0081* (2013.01); *H04N 2201/0471* (2013.01); *H04N 2201/04756* (2013.01); *H04N 2201/04767* (2013.01)

USPC ........ 358/1.13; 358/494; 358/1.12; 358/1.14; 358/1.15; 358/1.16; 358/1.18

(58) Field of Classification Search
None
See application file for complete search history.

(56) References Cited

U.S. PATENT DOCUMENTS

| | | | |
|---|---|---|---|
| 5,444,555 A * | 8/1995 | Ono .............................. | 358/494 |
| 2001/0053002 A1 * | 12/2001 | Kageyama et al. ........... | 358/471 |
| 2006/0274377 A1 * | 12/2006 | Chun .......................... | 358/3.26 |

(Continued)

FOREIGN PATENT DOCUMENTS

| | | |
|---|---|---|
| CN | 1175842 A | 3/1998 |
| CN | 1870713 A | 11/2006 |
| CN | 101459754 A | 6/2009 |

(Continued)

*Primary Examiner* — Miya J Cato
(74) *Attorney, Agent, or Firm* — Canon U.S.A., Inc. IP Division

(57) ABSTRACT

A reading apparatus includes an image sensor, a movement mechanism including a motor that relatively moves between a document and the image sensor, an encoder that detects information about the relative movement, and a control unit that controls driving of the motor and reading by the image sensor based on the detection by the encoder, wherein when a read-suspension event occurs during the reading, the control unit performs control such that the reading is continued while decelerating the motor, a relative position of a last read pixel with respect to a read position by the image sensor is monitored based on the detection by the encoder, and the driving of the motor is stopped when the read position is determined to reach a stop position set within the last read pixel, and the motor is driven again to resume the reading with a pixel next to the last read pixel.

9 Claims, 13 Drawing Sheets

(56) References Cited

U.S. PATENT DOCUMENTS

2008/0050165 A1* 2/2008 Saito et al. .................. 400/582
2011/0242620 A1* 10/2011 Yamamoto .................. 358/488

FOREIGN PATENT DOCUMENTS

| EP | 1748637 A1 | 1/2007 |
| JP | 2009-246665 A | 10/2009 |

* cited by examiner

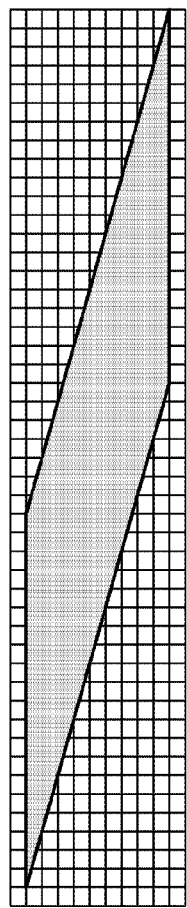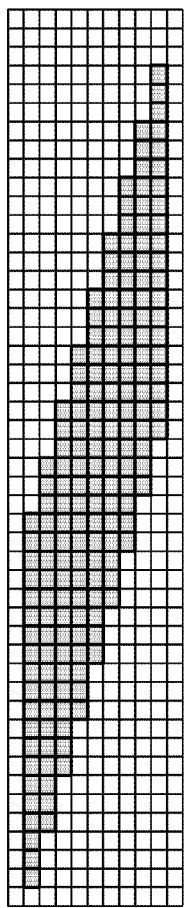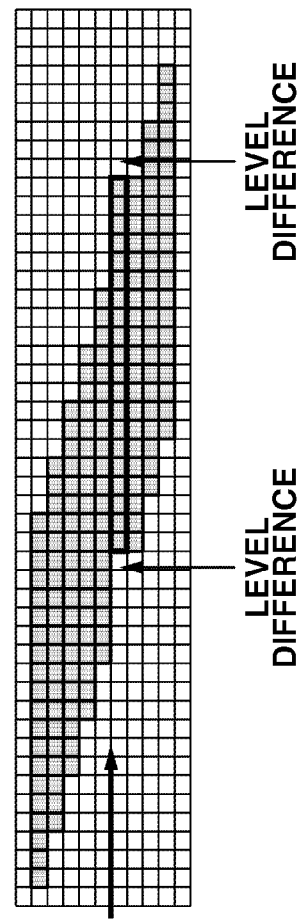
FIG.10A
FIG.10B
FIG.10C
POSITION WHERE READ-SUSPENSION EVENT OCCURS
LEVEL DIFFERENCE
LEVEL DIFFERENCE

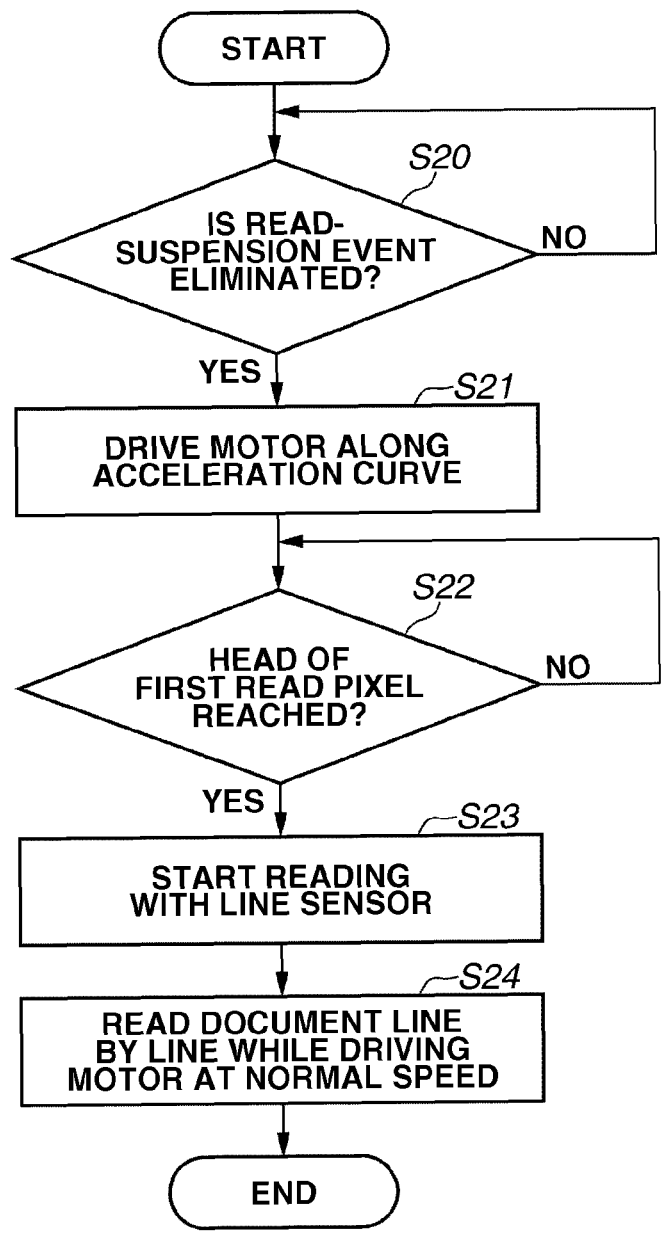

READING APPARATUS AND READING CONTROL METHOD THAT REDUCES MISALIGNMENT AT A JOINT BETWEEN A PIXEL READ BEFORE A READ-SUSPENSION EVENT AND A PIXEL READ AFTER THE READ-SUSPENSION EVENT

BACKGROUND OF THE INVENTION

1. Field of the Invention

The present invention relates to a reading apparatus for reading an image of a document.

2. Description of the Related Art

There is known a reading apparatus which reads an image of a document while relatively moving the document and an image sensor. One type is a flatbed scanner (abbreviated to FBS in the present specification) which performs scanning while moving an image sensor (line sensor) with respect to a document fixed on a document positioning plate. Another type is a sheet-through scanner which performs scanning while moving a document with respect to a fixed image sensor (line sensor). A unit which moves sheets of the document while separating the sheets one by one is referred to as an auto document feeder (abbreviated to ADF in the present specification).

Japanese Patent Application Laid-Open No. 2009-246665 discusses a reading apparatus that combines the above two types. The apparatus discussed in Japanese Patent Application Laid-Open No. 2009-246665 can read an image in a movement at a constant speed and can also read the image in a movement at an accelerating or decelerating speed.

In such a reading apparatus, a read-suspension event may occur during the reading of the document. Examples of the event may be as follows:

(1) There is a limitation to the capacity of a buffer memory which temporarily stores data output from a line sensor before the data is transmitted to a main storage unit. There may be considered a mode for temporarily suspending the reading and waiting until an empty space is provided in the buffer memory when the capacity of the buffer memory is to become full. This is one example of the read-suspension event.

(2) If the reading is continued in succession for a long time, heat generation of a motor serving as a movement driving source is increased. In order to prevent the motor from being overheated beyond an allowable level, there may be considered a mode for waiting for temperature drop of the motor by temporarily suspending the reading or a mode for suppressing an excessive temperature rise by performing an intermittent operation. This is another example of the read-suspension event.

SUMMARY OF THE INVENTION

The present invention is directed to a reading apparatus capable of reading an image without any problem even when a read-suspension event occurs during reading of a document.

According to an aspect of the present invention, a reading apparatus includes an image sensor, a movement mechanism including a motor configured to relatively move between a document and the image sensor, an encoder configured to detect information about the relative movement, and a control unit configured to control driving of the motor and reading by the image sensor based on the detection by the encoder, wherein when a read-suspension event occurs during the reading by the image sensor, the control unit performs control such that the reading is continued while decelerating the motor, a relative position of a last read pixel of the document with respect to a read position by the image sensor is monitored based on the detection by the encoder, and the driving of the motor is stopped when it is determined that the read position has reached a stop position set within the last read pixel, and after the stop, the motor is driven again to resume the reading with a pixel next to the last read pixel.

According to an exemplary embodiment of the present invention, in a case where a relative movement is stopped due to the occurrence of the read-suspension event, the motor driving is stopped when the read position by the image sensor reaches a predetermined position set in the last read pixel of the document. Therefore, the reading can be surely resumed with the pixel next to the last read pixel, thereby suppressing the occurrence of misalignment (a level difference) at a joint portion between the read pixel before suspension and the read pixel after resumption. This can realize the reading apparatus capable of reading the image without any problem even when the read-suspension event occurs during the reading of the document.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 10A, 10B, and 10C are conceptual diagrams illustrating states in which a level difference occurs between images.

FIG. 13 is a flow chart illustrating an operation sequence of an apparatus (at the time of resumption).

DESCRIPTION OF THE EMBODIMENTS

Various exemplary embodiments, features, and aspects of the invention will be described in detail below with reference to the drawings.

An exemplary embodiment of the present invention can be applied to a reading apparatus which includes an auto document feeder and reads a document with an image sensor. In the present specification, the reading apparatus is not limited to a single-function apparatus having only a reading function, and a multifunction apparatus including a printing function or other functions along with a reading function is also referred to as the reading apparatus.

Figure 1A:
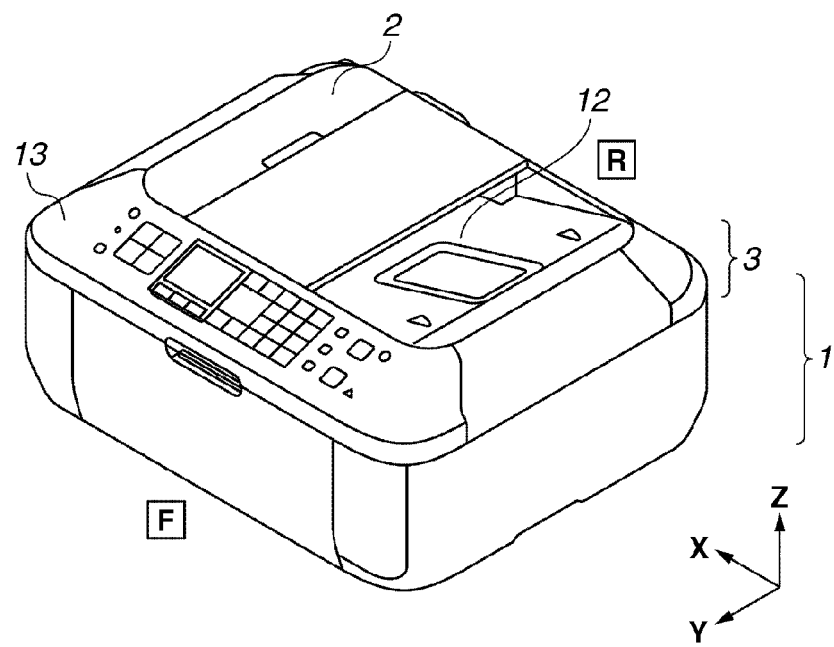
FIGS. 1A and 1B are perspective views illustrating an outer appearance of an image reading apparatus according to an exemplary embodiment of the present invention.
Figure 1B:
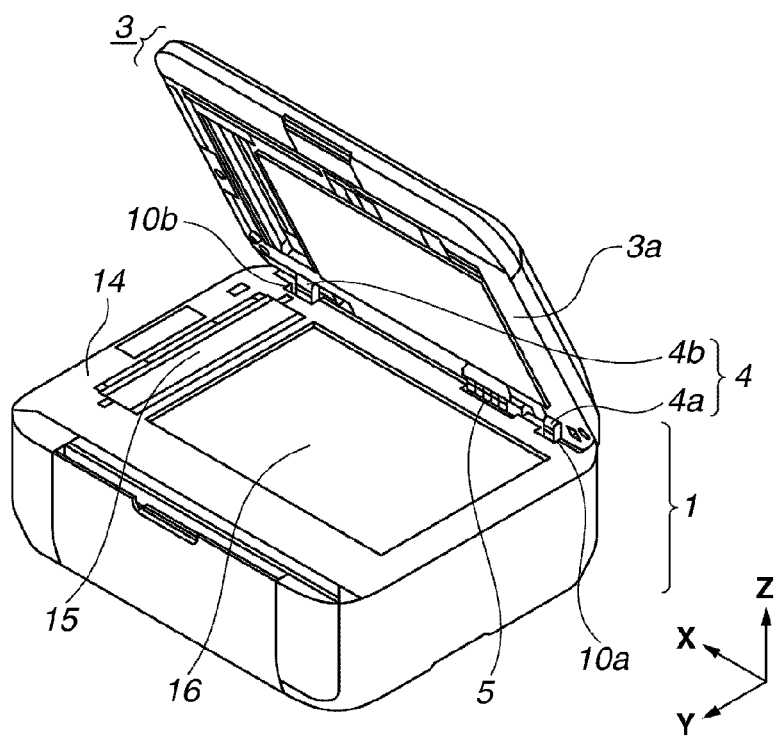

FIGS. 1A and 1B are perspective views illustrating an outer appearance of an image reading apparatus according to an exemplary embodiment of the present invention. The reading apparatus 1 includes a document positioning plate unit 14 provided with an image sensor configured to read a document, and an ADF 3 configured to be opened or closed by a hinge 4 with respect to the document positioning plate unit 14. FIG. 1A illustrates a state in which the ADF 3 is closed with respect to the document positioning plate unit 14, and FIG. 1B illustrates a state in which the ADF 3 is opened with respect to the document positioning plate unit 14. An FBS and a printing unit capable of printing a read document image are provided under the document positioning plate unit 14. The reading apparatus according to the exemplary embodiment can read the document both in a sheet-through method using the ADF or an FBS method.

On the top surface of the ADF 3, an operation panel 13 is provided on the front side of the reading apparatus 1 (front side indicated by reference symbol F in FIG. 1A). The operation panel 13 is a user interface in which an indicator or an input unit is arranged.

A substantial portion of the ADF 3 is a feeding unit 2 configured to move document sheets one by one by to a read position by the scanner and to discharge the sheets. On a base 3a which is a housing of the ADF 3, the feeding unit 2 and a discharge tray 12 are provided.

The ADF 3 is mounted to be openable with respect to the document positioning plate unit 14 by a hinge 4. The hinge 4 includes hinges 4a and 4b provided at two positions along an edge of a rear side of the document positioning plate unit 14 of the reading apparatus 1 (rear side indicated by reference symbol R in FIG. 1A). A user performs an opening/closing operation with his/her hand from a front side of the reading apparatus 1 (front side indicated by reference numeral F in FIG. 1A).

Each of the two hinges 4a and 4b includes a rotational shaft and a damper mechanism, and the two rotational shafts have the same direction (X-direction). In each of the hinges 4a and 4b, one of the hinge components is fixed to the base 3a, and the other of the hinge components is fixed to the document positioning plate unit 14. Specifically, the other hinge component is vertically-slidably inserted into and fixed to concave portions 10a and 10b formed in a base 10 which is a housing of the FBS. Therefore, even a thick book document can be surely pressed.

Between the hinges 4a and 4b, a hole 5 for allowing an electrical cable to pass through is provided on the frame 3a of the ADF 3 and the top surface of the document positioning plate. The electrical cable, which is made of a flexible flat cable (FFC) or the like to be connected to electrical components such as a motor or an encoder sensor embedded into the feeding unit 2 of the ADF 3, is wired through the hole 5 and is connected to a main board (control unit) provided inside the document positioning plate. In this manner, the electrical cable is wired without passing through the side of a gear train 9d and is connected to the control unit. Therefore, even when the position of the electrical cable is misaligned by shock or vibration, there is no possibility that the cable will come into contact with the gear.

As illustrated in FIG. 1B, on the top surface of the document positioning plate, an elongated reading window 15 made of a glass plate is formed to read a document by a sheet-through method using the ADF 3. Next to the reading window 15, a reading surface 16 made of a glass plate is formed to place a document to be read by the FBS. On the reading surface 16, one-sheet document or book document is placed by the user. The reading window 15 and the reading surface 16 may be made of a single glass plate. Below the reading window 15, a line sensor which is located at a home position is oppositely-arranged. The line sensor is a contact image sensor (CIS) that includes a sensor unit including a plurality of light receiving elements arranged in a line shape and a lens array of cylindrical lenses.

Figure 2:
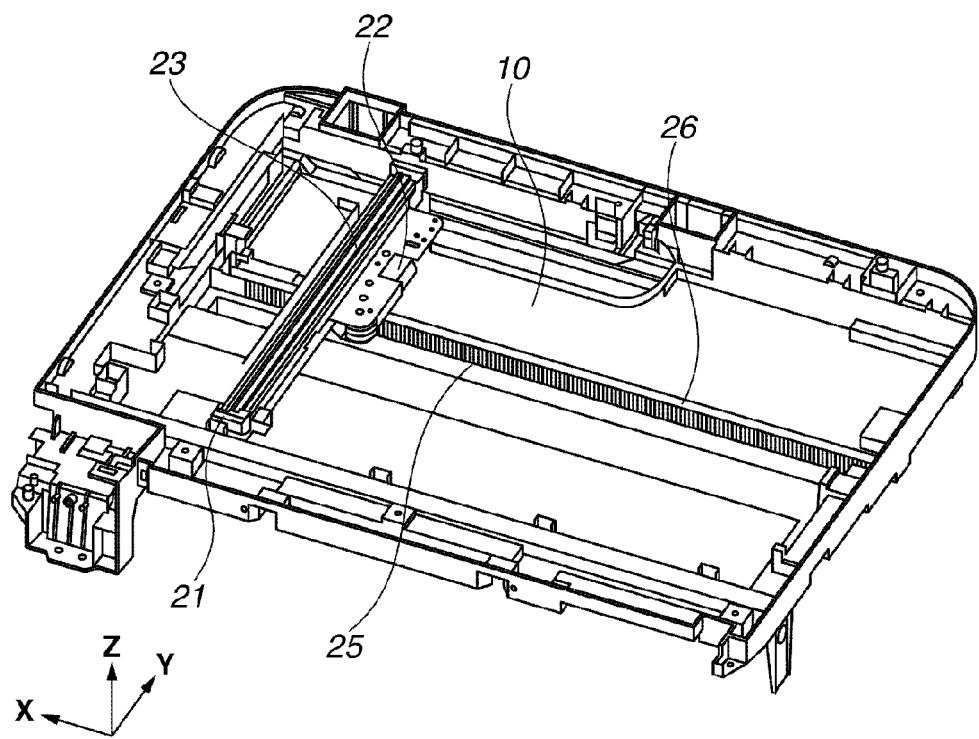
FIG. 2 is a perspective view illustrating a structure of an FBS.

FIG. 2 is a perspective view illustrating a structure of an FBS provided under the glass plate of the reading surface 16. A line sensor unit 23 is held in a carriage 21 and one-dimensionally moves in the X-direction. The carriage 21 is mounted with a gear train and a motor 22 which is a driving source for moving the carriage 21. In the base 10 which is the housing of the FBS, a rack gear 25 and a guide rail 26 are fixed in the same direction. If the motor 22 is rotated, a pinion gear engaged with the rack gear 25 is rotated and the carriage 21 is moved along the guide rail 26. Below the FBS, the printing unit is provided to perform printing on a sheet in an inkjet method.

Figure 3:
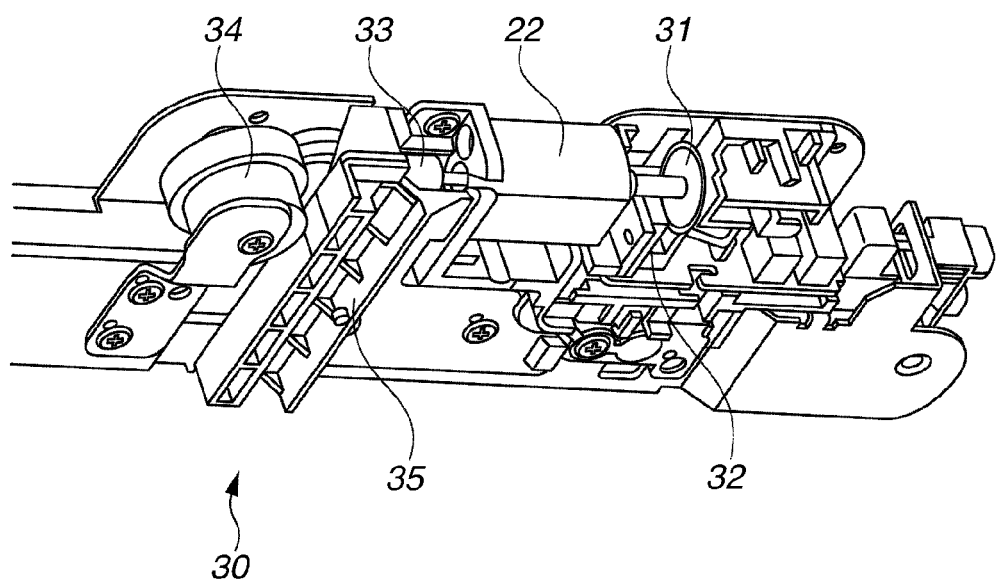
FIG. 3 is a perspective view illustrating a detailed structure of a driving unit of an FBS.

FIG. 3 is a perspective view illustrating a structure of a driving unit of the FBS. A worm gear 33 is mounted at one end of the rotational shaft of the motor 22, which is a DC motor, and a code wheel 31 of an encoder unit is mounted at the other end thereof. The encoder sensor 32 reads a slit formed in the code wheel 31 and generates a pulse signal. The rotation of the motor 22 rotates a drive gear 34 through a transmission gear train. The drive gear 34 is engaged with the rack gear 25. As a slider 211 mounted on the driving unit slides along the guide rail 26, the carriage 21 moves in the X-direction.

When the document reading is performed with the FBS, the user opens the ADF 3, places the sheet document or book document on the reading surface 16, and closes the ADF 3 to fix the document. Then, the document is read with the line sensor unit 23, while moving the line sensor unit 23 in the carriage 21.

When the document reading is performed by the sheet-through method, the sheet documents are fed one by one by the feeding unit 2 of the ADF 3, and the document passing over the reading window 15 is read by the line sensor unit 23 which remains stationary at the home position.

Figure 4:
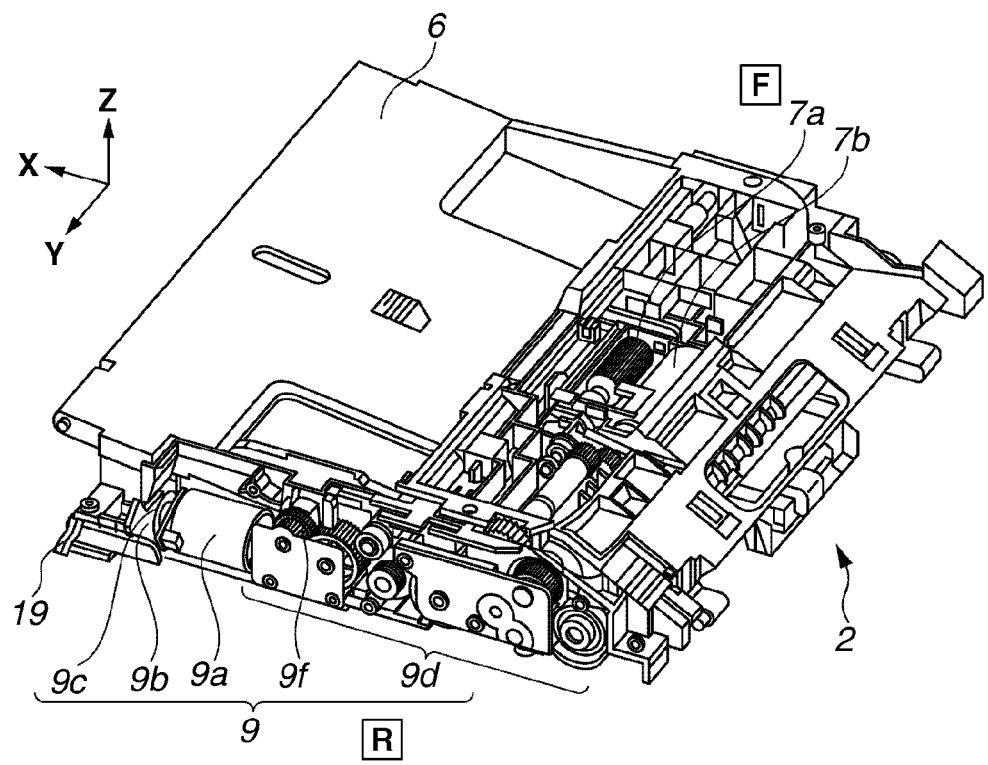
FIG. 4 is a perspective view illustrating a structure of an ADF.
Figure 5:
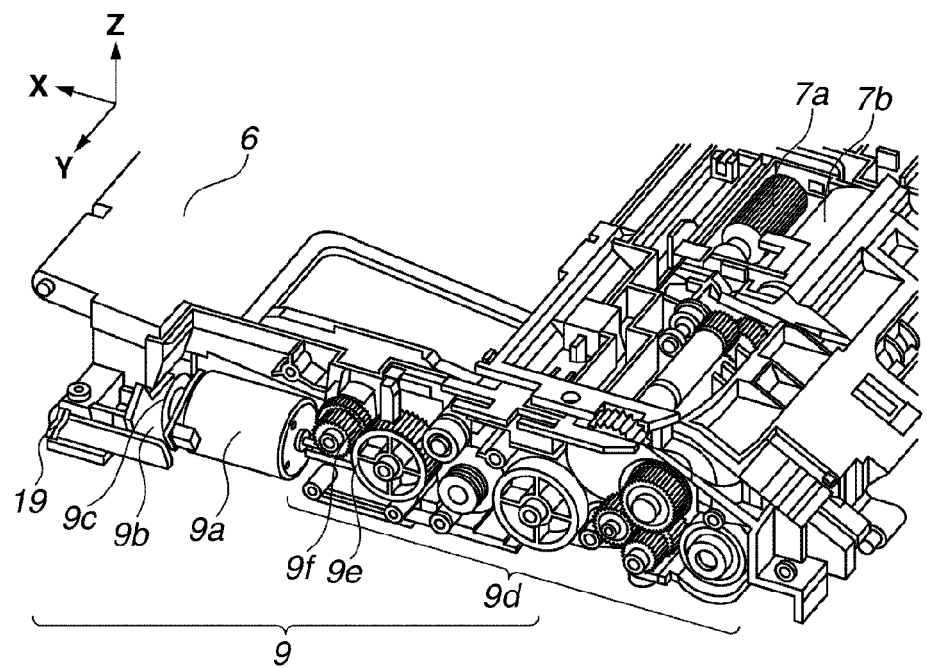
FIG. 5 is a perspective view illustrating a structure of an ADF.
Figure 6:
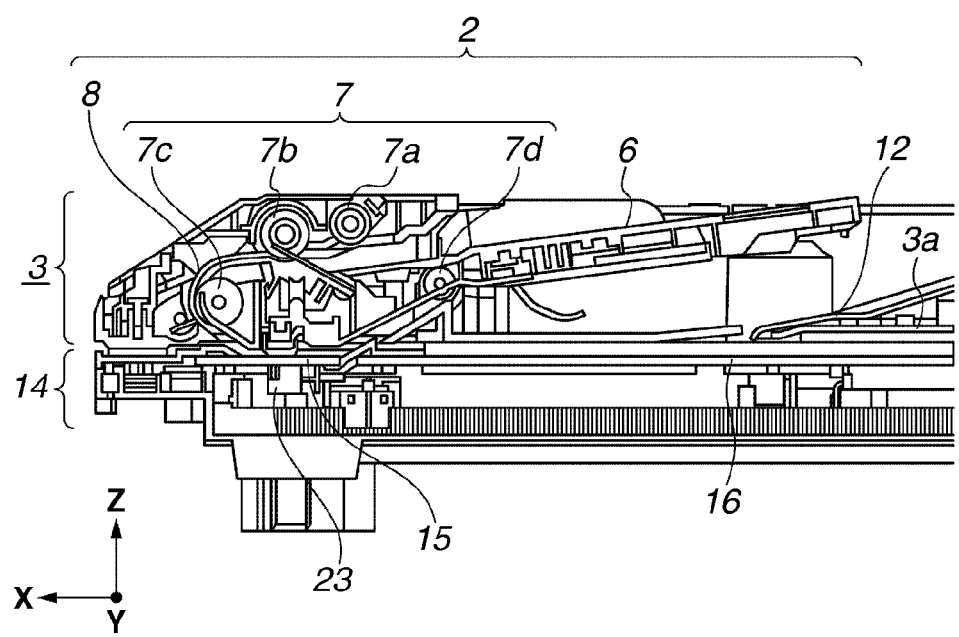
FIG. 6 is a cross-sectional view illustrating a structure of an ADF.

Hereinafter, the feeding unit 2 included in the ADF 3 will be described. FIG. 4 is a perspective view illustrating the structure of the feeding unit 2, FIG. 5 is a cross-sectional view illustrating the structure of the gear train in FIG. 4, and FIG. 6 is a cross-sectional view of the feeding unit 2.

The feeding unit 2, which is the substantial portion of the ADF 3, mainly includes a sheet feeding tray 6, a roller group 7 configured to move documents one by one, a motor 9a, a transmission gear train 9d configured to transmit the rotation of the rotational shaft of the motor 9a to the roller group 7, and an encoder unit configured to detect rotation information of the motor 9a. The motor 9a is a DC motor. The encoder unit includes an encoder sensor 9b and a code wheel 9c. A driving unit 9 is constituted by the motor 9a, the encoder sensor 9b, the code wheel 9c, and the transmission gear train 9d.

In the direction (X-direction) of the rotational shaft of the hinge 4, at least part of the transmission gear train 9d, the motor 9a, and the code wheel 9c, which constitute the driving unit 9, are sequentially disposed in series between the hinges 4a and 4b provided at two positions.

The sheet feeding tray 6 capable of stacking a plurality of documents is provided above the feeding unit 2. The roller group 7 includes a plurality of rollers configured to convey documents placed in the sheet feeding tray 6 one boy one. A document conveyance path 8 is turned in a U-turn shape on the way, and a sheet travelling direction is reversed.

The roller group 7 includes four rollers, that is, a pickup roller 7a, a separation roller 7b, a conveying roller 7c, and a discharge roller 7d. The pickup roller 7a picks up the topmost document among a plurality of documents stacked on the sheet feeding tray 6. The separation roller 7b surely separates the picked-up document from the documents thereunder. The conveying roller 7c is provided in the middle of the path 8 and moves the sheet with respect to the line sensor at the time of document reading. The document, the reading of which is completed, is discharged to the discharge tray 12 by the discharge roller 7d.

At the hinge 4 side (rear side) of the feeding unit 2, the motor 9a and the transmission gear train 9d are disposed. The motor 9a serves as the driving source, and the transmission gear train 9d decelerates and transmits the rotation of the motor to the respective rollers of the roller group 7. A body of the motor 9a has a vertically elongated cylindrical shape in which the direction of the rotational shaft (X-direction) is longer than the radial direction (Y-direction and Z-direction). The rotational shaft (output shaft) of the motor 9a protrudes lengthwise at both sides (head side and tail side) with respect to the body of the motor 9a. The direction of the rotational shaft is parallel to the rotational shafts of the hinges 4a and 4b (the term "parallel" used herein is not limited to strict parallel, and includes substantially parallel). Also, the direction of the rotational shaft of each of the rollers constituting the roller group 7 is Y-direction and is intersected with the direction of the rotational shaft (perpendicular in the exemplary embodiment, but may not be perpendicular).

A worm gear 9e, which is one portion of the transmission gear train 9d, is mounted in the end portion (head side, referred to as a first end portion) of the rotational shaft of the transmission gear train 9d. The transmission gear train 9d includes a plurality of gears, including a gear 9f engaged with the worm gear 9e, and transmits the rotation of the motor 9a to each gear. The transmission gear train 9d includes gears mounted at end portions of rotational shafts of the pickup roller 7a, the separation roller 7b, the conveying roller 7c, and the discharge roller 7d, and a plurality of idler gears for driving transmission between these gears. When viewed from the upward direction (Z-direction), the gear train 9d is disposed substantially in a direction in which the rotational shaft extends. Also, when viewed from the lateral direction (Y-direction), the gear train 9d is disposed substantially in a direction in which the rotational shaft extends. The rotational shaft may be slightly tilted with respect to a direction in which the train of the gear train 9d is formed.

Meanwhile, in the end portion (tail side, referred to as a second end portion) of the rotational shaft of the side opposite to the worm gear 9e side, the code wheel 9c of the encoder unit configured to detect the rotational state (rotation amount or rotation speed) of the motor 9a is mounted. Furthermore, the encoder sensor 9b including a photo interrupter is provided to optically detect a slit pattern formed in the code wheel 9c in a circumferential shape.

As such, in the end portion (first end portion) of one rotational shaft of the motor 9a, the worm gear 9e constituting one portion of the transmission gear train 9d is mounted, and in the end portion (second end portion) of the other rotational shaft, the code wheel 9c is mounted. Accordingly, the encoder sensor 9b is also disposed in the second end portion. That is, the code wheel 9c, the motor 9a, and gears constituting the transmission gear train 9d, which constitute the driving unit 9, are disposed substantially in parallel in a row, which realizes high space efficiency.

With the rotation of the motor 9a, the code wheel 9c coaxial to the rotational shaft is also rotated, and the encoder sensor 9b outputs a pulse signal according to the passage of the slit. By counting the number of pulses, the motor rotation state (rotation amount or rotation speed) can be detected. The control unit controls the rotation of the motor according to the detection result, such that a document is conveyed at a predetermined speed or a predetermined amount of documents is conveyed.

Hereinafter, the operation for reading the document in the sheet-through method by the ADF 3 will be described. A basic movement is that documents are separated and conveyed one by one by the feeding unit 2, the documents pass through the read position 18 of the reading window 15 at a constant speed, and the read documents are discharged to the discharge tray 12 one by one.

The user first sets one or a plurality of documents on the feeding tray 6, and presses a scan start button provided on the operation panel 13. There is provided a sensor configured to detect the document(s) set on the feeding tray. When the presence of the document(s) is detected by the sensor, the control unit starts driving to rotate the motor 9a. With the rotation of the motor 9a, the rotation is transmitted from the gear included in the transmission gear train 9d, that is, the worm gear 9e, to the gear 9f, and the subsequent gear train. In this manner, the pickup roller 7a, the separation roller 7b, the conveying roller 7c, and the discharge roller 7d, which constitute the roller group 7, are concurrently rotated.

At the beginning, the pickup roller 7a is pressed onto the topmost document of the stacked documents, and the documents are picked up by the rotation of the pickup roller 7a. The picked-up documents are separated one by one by frictional force between the separation roller 7b and a separation pad facing the separation roller 7b. The documents are conveyed along the path 8 at a constant speed by the conveying roller 7c. In a state where the reading surface (front surface) of the document faces the side of the reading window 15, the image reading is performed while scanning the document at a constant speed with respect to the line sensor unit 23. Then, the read document is discharged to the discharge tray 12 by the discharge roller 7d.

Figure 7:
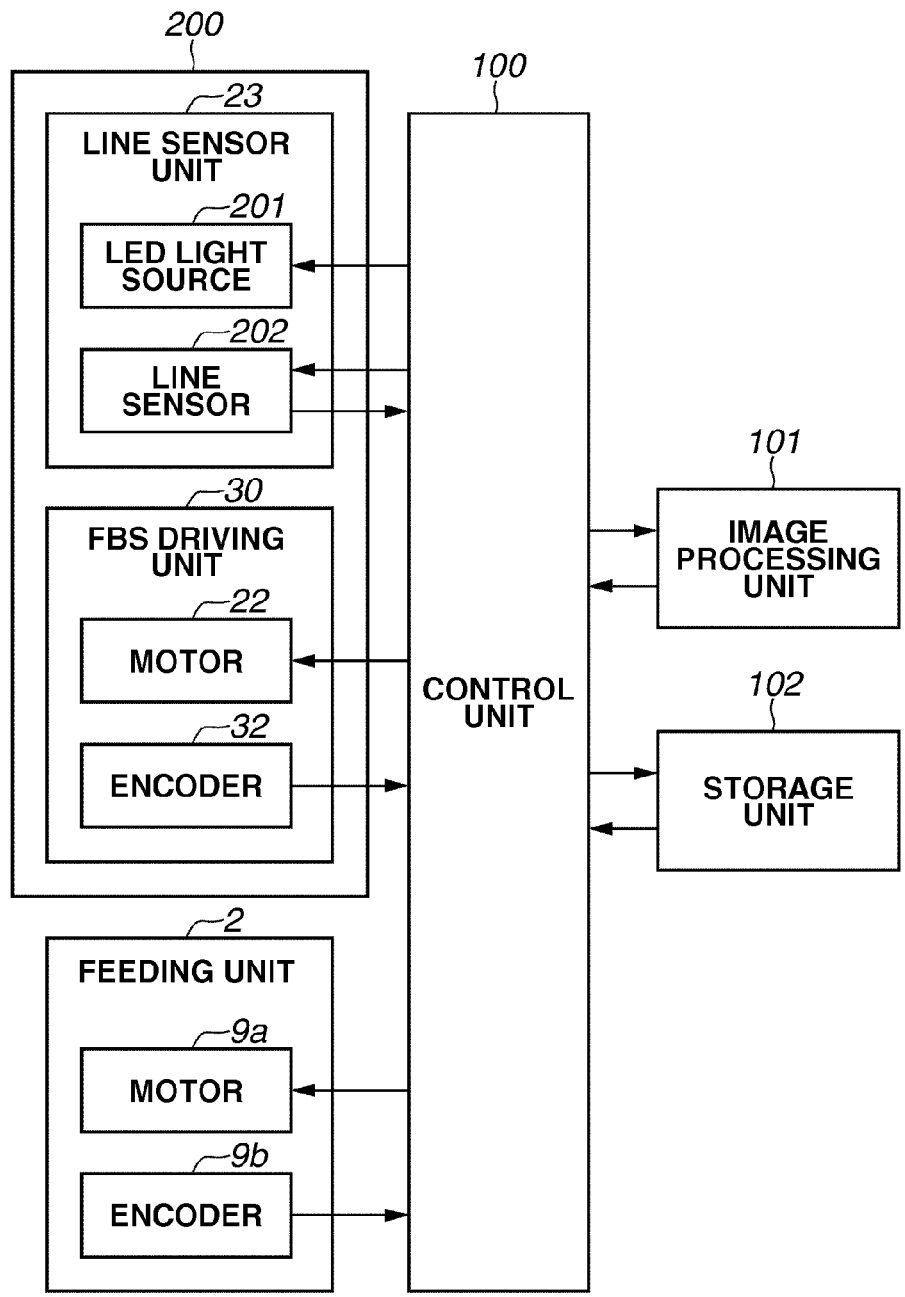
FIG. 7 is a block diagram illustrating a system configuration focusing on a control unit.

FIG. 7 is a block diagram illustrating a system configuration focusing on a control unit. The control unit 100 includes a CPU and manages various controls, such as reading control. Elements including an image processing unit 101 dedicated to image processing, a storage unit 102, a line sensor unit 23, an FBS driving unit 30, and a feeding unit 2 are connected to the control unit 100. An LED light source 201 and a line sensor 202 included in the line sensor unit 23 are connected to the control unit 100. A motor 22 and an encoder sensor 32 included in the FBS driving unit 30 are connected to the control unit 100. A motor 9a and an encoder sensor 9b included in the feeding unit 2 are connected to the control unit 100.

In the document reading of the apparatus having the above configuration, the document image is read in pixel units. The term "pixel" used herein is a virtual pixel defined by dividing the vertical direction (document movement direction) and the horizontal direction (element arrangement direction of the line sensor) of the document surface into pixels having a predetermined pitch. A size of one pixel in the horizontal direction is equal to a size of one element of the line sensor. A size of one pixel in the vertical direction is determined by a document movement speed and a reading timing of the line sensor. For example, if a reading resolution is 600 dpi, one pixel has a length of 1/600 inch.

Next, the control at the occurrence of the read-suspension event during document reading, which is the characteristic of the exemplary embodiment, will be described. In the reading apparatus according to the exemplary embodiment, the following read-suspension event may occur during the document reading.

(1) If the capacity of the buffer memory, which temporarily stores data output from the line sensor before the data is transmitted to the main storage unit, is to become full, the reading is temporarily suspended and the reading apparatus waits until the empty space is provided in the buffer memory.
(2) When the reading is continued in succession for a long time, in order to prevent the motor from being overheated beyond an allowable level, the reading is temporarily suspended and the reading apparatus waits for temperature drop of the motor, or an intermittent operation is performed to suppress an excessive temperature rise.

Figure 8:
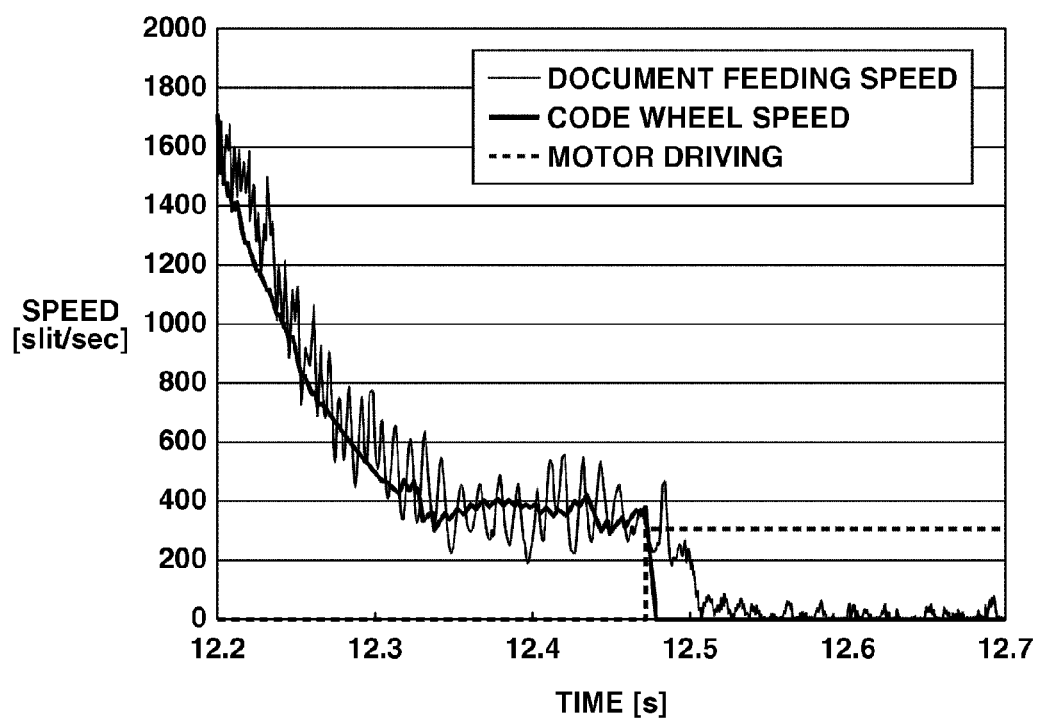
FIG. 8 is a graph illustrating a relation between a signal waveform and an actual document movement speed at the time of stop.

An issue that may arise when the read-suspension event occurs will be described. FIG. 8 is a graph illustrating an example of change in the speed (motor rotation speed) detected by the code wheel and the actual document movement speed, when the rotation of the motor is decelerated and stopped due to the occurrence of the read-suspension event. A horizontal axis represents time [sec], and a vertical axis represents speed [slit/sec]. In the graph, a motor output signal represents on (signal level 0) and off (signal level 1) of the motor driving and does not include speed information when the motor driving is on. For comparison with the document movement speed, the speed detected by the code wheel represents a value obtained by multiplying a deceleration ratio of the transmission gear train.

As can be seen from the graph in FIG. 8, when the motor output signal is interrupted (the signal changes from 0 to 1), the motor is immediately stopped, and the rotation of the code wheel directly connected to the rotational shaft of the motor is also immediately stopped. However, even after the motor is stopped, the actual document movement speed does not immediately become zero, and a delay occurs until the document stops (for example, delay of about 0.03 seconds). That is, even though the motor stops rotating and the encoder does not detect any rotation, the document continues to move for a small distance. This is because when the rotation of the motor is transferred to the conveying roller through the transmission gear train, the conveying roller is continuously rotated by some play between the gears of the transmission gear train, even when the motor is stopped, and the document is moved more than necessary. In the present specification, this is referred to as overrun.

The overrun may cause the following problems. Here, the case where the read-suspension event occurs and the reading is continued until stop while decelerating the motor will be considered. If the stop position is not strictly controlled, the state where the last read pixel (virtual pixel) of the document will be stopped with respect to the read position by the line sensor cannot be expected. There may be many cases, for example, a case where the last read pixel is stopped in a state where the read position is located near the head, a case where the last read pixel is stopped in a state that the read position is located near the central portion of the read pixel, and a case where the last read pixel is stopped in a state where the read position is located near the end of the read pixel.

At the time of document reading, while scanning the document, each light receiving element constituting the line sensor receives light only for a predetermined (constant) exposure period with respect to one pixel of the document, and concentration information is obtained according to accumulation of charges during that period. Therefore, as the scan speed is lowered, an area where the reading is performed within one pixel is narrowed. That is, immediately before the document is stopped, the line sensor does not read whole area within the pixel but reads a narrow range from the head of the pixel.

Figure 9A:
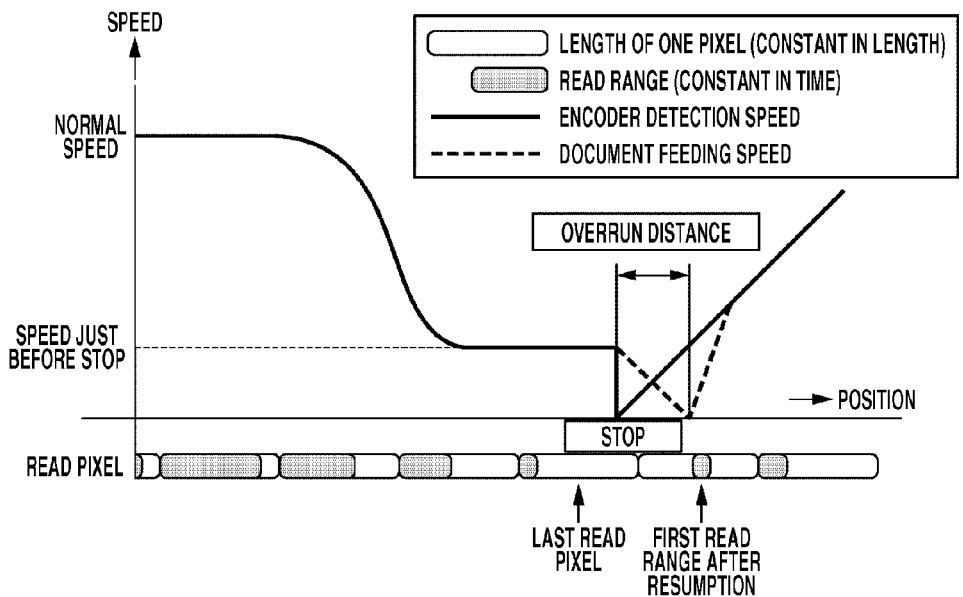
FIGS. 9A and 9B are conceptual diagrams describing an issue caused by overrun.
Figure 9B:
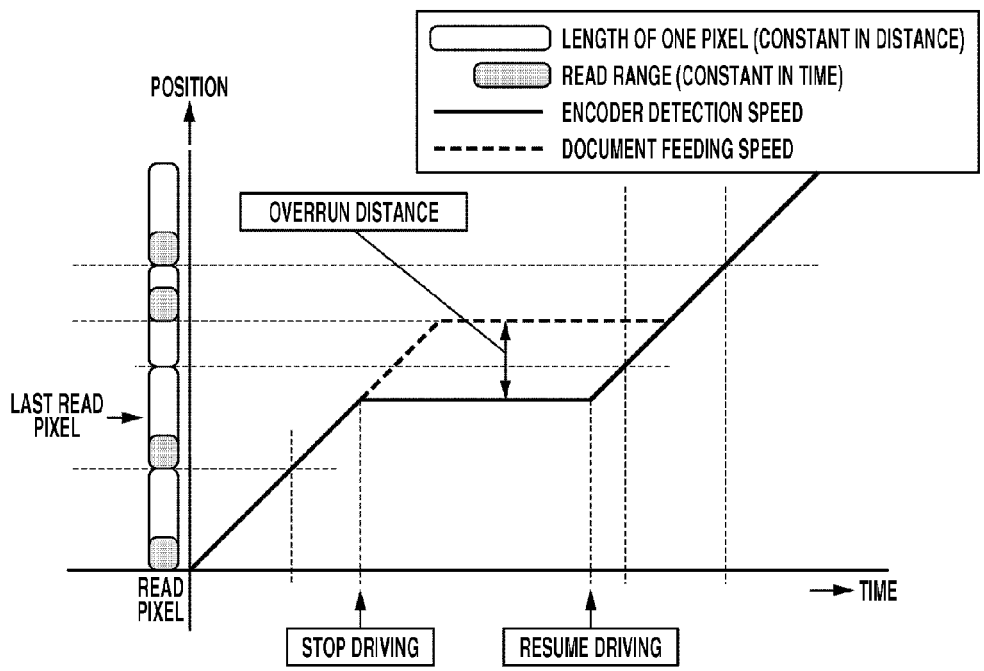

FIGS. 9A and 9B are schematic diagrams illustrating the above state. The read time for one pixel is the same constant time. FIG. 9A is a graph where the horizontal axis indicates position, and FIG. 9B is a graph where the horizontal axis indicates time. The length of one pixel in the scanning movement direction is the same constant size, and the read area in one pixel is gradually narrowed as the motor driving speed (document movement speed) is lowered.

If the document stop position (position detected by the encoder) is located near the end of the read pixel with respect to the read position by the line sensor, the actual document stop position may pass through the last read pixel and the document may move to the next pixel area due to the overrun. FIGS. 9A and 9B illustrate the state where such phenomenon occurs. Whether this phenomenon occurs is determined by a relation of the size (fixed) of one pixel determined by the reading resolution, the overrun distance (fixed) after the motor stops, and the motor stop timing (variable). As such, it is likely that the read pixel which can be known by the detection of the encoder may be different from the actual read pixel.

In a case where the actual document stop position passes through the last read pixel and moves to the next pixel area due to the overrun, when the suspension event is eliminated and the reading is resumed, the line sensor performs reading from the middle of the first read pixel after resumption. That is, while the last read pixel just before stop receives light from the head of the pixel, the first read pixel after the resumption receives light from not the head of the pixel but the middle of the pixel. In the example in FIG. 9A, only the first read pixel after resumption includes the narrow read range near the center of the pixel.

Therefore, the distance between the last read pixel and the first read pixel becomes longer than the original pixel pitch. That is, if the image read until stop and the image read after resumption are combined, a level difference is formed in the joint portion to the extent that the user can visually recognize the level difference. The level difference may be visually recognized as a line. FIGS. 10A, 10B, and 10C are schematic diagrams describing the above state. FIG. 10A is a schematic diagram of a document image, FIG. 10B is a schematic diagram of an appropriately read image, and FIG. 10C is a schematic diagram of an image in which a large level difference occurs in a joint portion due to the occurrence of the read-suspension event.

As described above, if the stop position of the last pixel is not controlled, the level difference, which is image unevenness, may occur in the finally-obtained read image. According to the exemplary embodiment, the above-described issue can be solved.

The basic solution mechanism is that the stop position of the last read pixel (position detected by the encoder) is controlled so that the actual document stop position with a delay caused by overrun is to be within the last read pixel.

Figure 11:
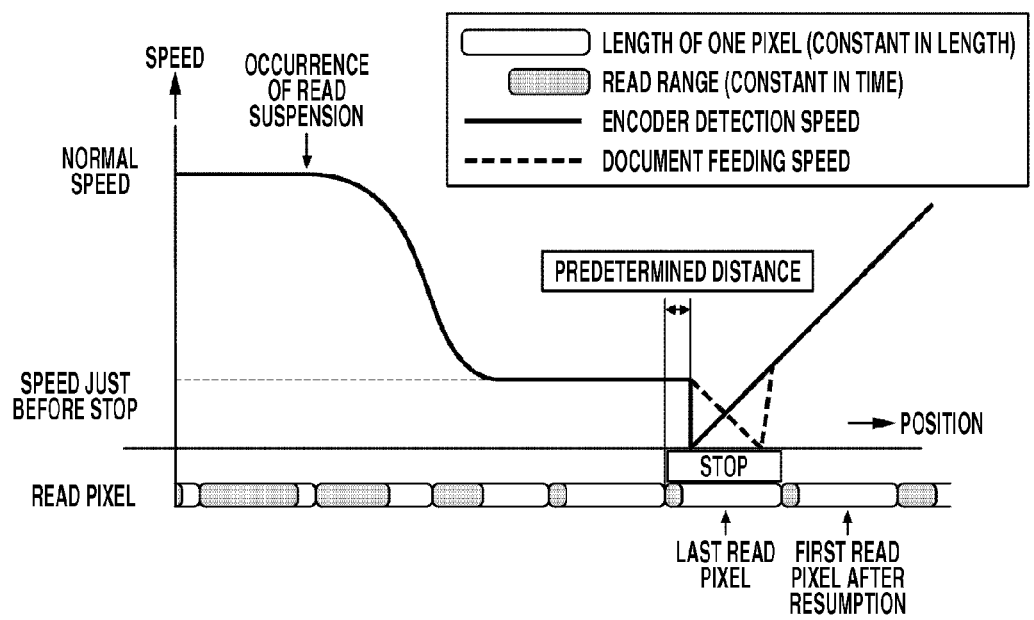
FIG. 11 is a conceptual diagram illustrating a relation between a motor driving speed and a read pixel.
Figure 12:
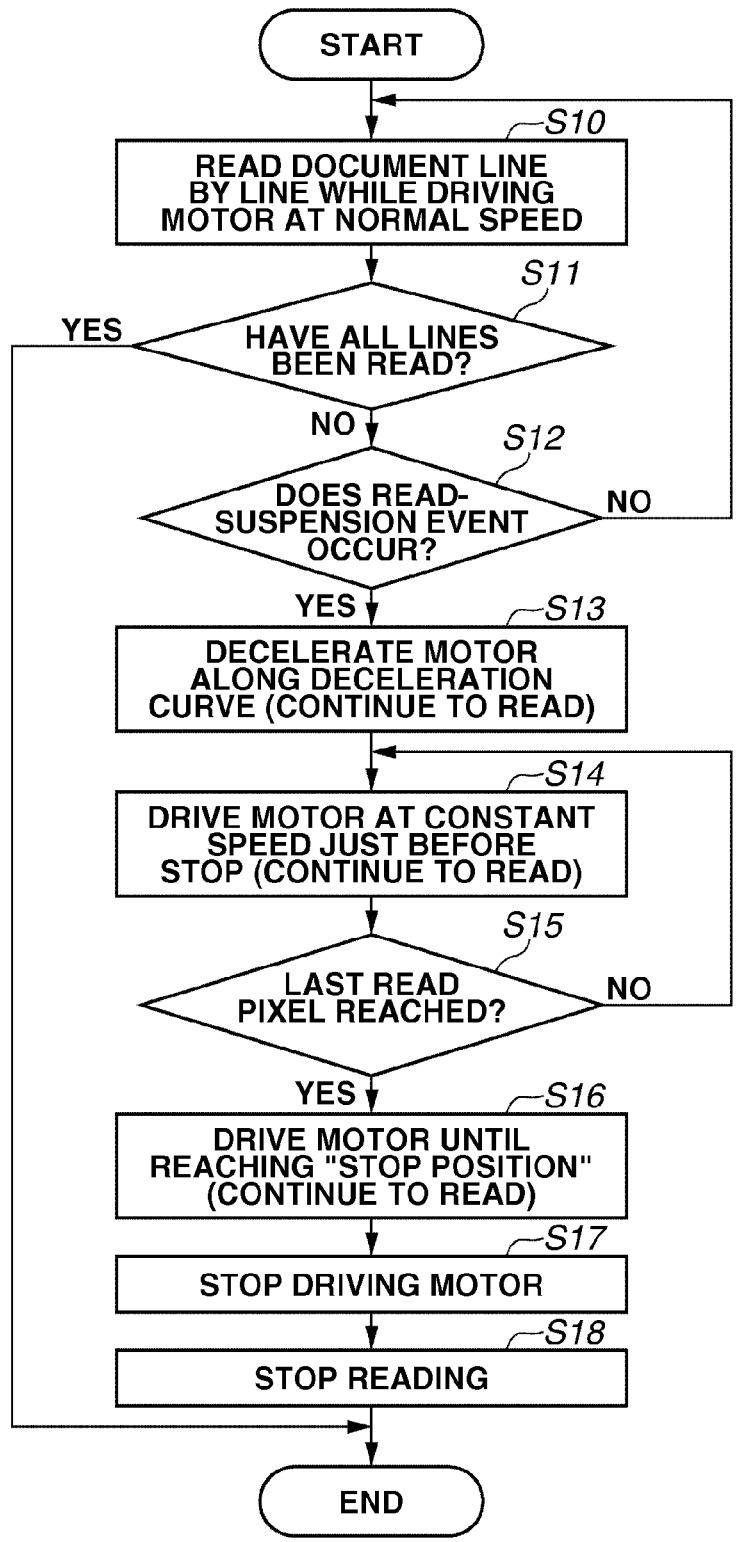
FIG. 12 is a flow chart illustrating an operation sequence of an apparatus (at the time of stop).

A control sequence of an apparatus for read suspension/resumption will be described in detail. FIG. 11 is a conceptual diagram illustrating a relation between a motor driving speed (control target curve) and a read pixel at the time of stop. FIG. 12 is a flow chart illustrating a read suspension processing sequence when a read-suspension event occurs.

In step S10, the document reading apparatus basically reads a document line by line with a line sensor while driving a motor at a normal speed (constant speed) to move the document. In step S11, when all lines of one document have been read without incident, the operation jumps to END and ends the sequence. In step S12, when a read-suspension event occurs on the way, the operation proceeds to step S13 to execute the sequence for read stop, and when no event occurs, the operation returns to step S10. As described above, the read-suspension event occurs when the buffer memory which temporarily stores data output from the line sensor is to become full, or the motor is to be overheated beyond an allowable level.

When proceeding to the sequence for read suspension, the document movement control gradually decelerates from the general normal speed (normal speed) to the speed just before stop along the control target curve. In step S13, even at this period, the document reading is continued line by line. When the speed becomes the speed just before stop, the speed is maintained at a constant speed. In step S14, the reading is continued at each pixel. The speed just before stop is a predetermined extremely-low speed at which the motor is to be stopped by minimizing a delay when the motor output is shutoff.

A read pixel at the time point when reaching the stop target position determined from the control target curve is referred to as a last read pixel. More specifically, a pixel next to the pixel or a pixel which is two or more ahead of the pixel read when the speed is decelerated to the speed just before stop is referred to as a last read pixel. In the example in FIG. 11, a pixel which is two ahead of the pixel is set as the last read pixel, but a pixel next to the pixel can be set as the last read pixel in order to stop in a shorter time.

As such, when the read-suspension event occurs, the reading is continued while the motor is decelerated. During the deceleration or movement at the speed just before stop, a relative position of the last read pixel of the document with respect to the read position by the image sensor is monitored by the detection of the encoder. In step S15, whether the read position has reached the last read pixel is determined through this monitor. If the determination is NO (NO in step S15), the operation returns to step S14, and if the determination is YES (YES in step S15), the operation proceeds to step S16.

When proceeding to step S16, the motor is driven at the speed just before stop, while monitoring the detection of the encoder, until the read position by the image sensor reaches a stop position, which is a previously set position of the last read pixel of the document. In step S17, when having reached the stop position, the driving of the motor is stopped. In step S18, the signal acquisition by the line sensor is stopped and the read operation is stopped. In this manner, the sequence is ended.

As described above, even after the motor stops rotating, the document is moved more than necessary due to the overrun. The overrun distance is generally defined by the play of the transmission gear and is shorter than the length of one pixel (in the present specification, this distance is referred to as an overrun distance). Therefore, when the stop position to stop the motor in the last read pixel is set to be close to the head of the pixel, the position where the document is actually stopped is to be within the same pixel and the read position by the line sensor remains within the same pixel, even when the overrun occurs. That is, the distance from the stop position to the end of the pixel is set to be longer than the overrun distance where the movement of the document is actually stopped after the motor stops rotating.

In the last read pixel, the distance (predetermined distance) from the head of the pixel to the stop position is strictly controlled. For this purpose, the detection resolution (sheet surface resolution) of the encoder in the document read position conversion is to be set to be two times or more the reading resolution by the line sensor. In the exemplary embodiment, with respect to the reading resolution (maximum resolution) of 1/600 inch (600 dpi), the detection resolution of the encoder is 1/36000 inch, which is a sufficiently high resolution. Therefore, the predetermined distance can be controlled in units of 1/60 (36000/600=60) pixel. The predetermined distance described above is obtained by subtracting the overrun distance from the length of one pixel, which is minimally zero and maximally 1. The predetermined distance is determined within this range. For example, by setting the predetermined distance to 5/60 pixel, the distance monitored by the detection of the encoder is controlled, such that the motor is stopped when the monitored distance reaches the predetermined distance.

Next, read resumption processing will be described. FIG. 13 is a flow chart illustrating a read resumption processing sequence. FIG. 11 illustrates a relation between a motor driving speed and a read pixel at the time of resumption. Since a horizontal axis in the graph in FIG. 11 indicates position, the concept of time is not illustrated. However, during a period from the stop of the motor after reading the last read pixel (motor driving stop) to the resumption of the reading (resumption of the motor driving), there exists a time to wait until the read-suspension event is eliminated.

In the flowchart in FIG. 13, in step S20, the reading apparatus waits for read resumption until the read-suspension event is eliminated. When the suspension event is caused by a full buffer, the reading apparatus waits until a sufficient empty space is provided in the buffer memory. When the suspension event is caused by a heat generation of the motor, the reading apparatus waits until a temperature of the motor drops below a predetermined temperature or waits until a predetermined time has elapsed.

In step S21, when the reading is resumed, the driving of the stopped motor is started and an acceleration driving is performed along an acceleration curve. In step S22, based on the detection of the encoder, it is determined whether the read position by the line sensor reaches the head of the first read pixel on the document.

The first read pixel is a pixel subsequent to the above-described last read pixel.

As indicated by the dashed line (document feeding speed) in the graph in FIG. 11, even when the overrun occurs in the actual document, the end of the last read pixel is stopped without passing through the read position by the line sensor. Therefore, when the motor driving is resumed, the head of the first read pixel after the resumption surely passes through the read position by the line senor.

When the detection value of the encoder is monitored from the resumption, it can be seen that the head of the first read pixel passes through the read position. In FIG. 11, the rise (dashed line) of the document feeding speed after the resumption is more rapid than the detection speed (solid line) of the encoder. This is because even after the resumption, the actual document conveyance start is delayed by the play of the gear with respect to the motor rotation start, and when the play is eliminated, the document conveyance is rapidly started.

In step S23, when having reached the head of the first reach pixel, the reading is started with the line sensor. In the first read pixel, one-line reading is performed only for a predetermined light receiving time from the moment of passing through the head of the pixel. In the first pixel, the speed is still low. Therefore, the light receiving range within the pixel is narrow. As the movement speed rises, the light receiving range within the pixel increases. Even during acceleration, the line-by-line reading is performed.

In step S24, when the motor is driven at a constant normal speed after acceleration driving, a general line-by-line reading is performed. This is the processing of the flow chart (step S10) in FIG. 12, and thereafter, returns to the processing sequence in FIG. 12.

As described above, if the stop position of the motor driving in the last read pixel is strictly controlled, the reading can be surely performed from the head of the pixel next to the last read pixel at the time of read resumption. For this reason, the occurrence of misalignment (a level difference) at the joint portion between the read pixel before suspension and the read pixel after resumption is suppressed. Therefore, as illustrated in FIG. 10B, an image without any misalignment can be obtained.

The exemplary embodiment described above is an example in which the invention is applied to the sheet-through scanner including the ADF configured to read the document while relatively moving the document with respect to the fixed image sensor. The present invention is not limited to the exemplary embodiment, and can also be applied to an FBS configured to read a fixed document while relatively moving a scanner with respect to the fixed document. That is, the same control as the exemplary embodiment described above may be applied to the driving control, in FIG. 2, which is performed by the motor 22 for movement of the carriage 21 and the encoder sensor 32. As described above, the present invention can be widely applied to reading apparatuses including a movement mechanism with a motor configured to relatively move the document and the image sensor.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-018918 filed Jan. 31, 2012, which is hereby incorporated by reference herein in its entirety.

What is claimed is:

1. A reading apparatus comprising:
an image sensor;
a movement mechanism including a motor configured to relatively move between a document and the image sensor;
an encoder configured to detect information about the movement; and
a control unit configured to control driving of the motor and reading by the image sensor based on detection by the encoder,
wherein, when a read-suspension event occurs during the reading by the image sensor, the control unit performs control such that the reading is continued while decelerating the motor,
a relative position of a last read pixel of the document with respect to a read position by the image sensor is monitored based on the detection by the encoder, and the driving of the motor is stopped when it is determined that the read position reaches a stop position set within the last read pixel, and
after the stop, the motor is driven again in a same direction without being reversed, to resume the reading with a pixel next to the last read pixel.

2. The reading apparatus according to claim 1, wherein, in the last read pixel, the stop position is determined such that a distance from the stop position to an end of the pixel is longer than a distance overrunning after the motor stops rotating and before the relative movement is actually stopped.

3. The reading apparatus according to claim 1, wherein a detection resolution of the encoder is two or more times a reading resolution.

4. The reading apparatus according to claim 1, wherein, when the read-suspension event occurs, the control unit drives the motor such that the motor is decelerated along a control target curve,
wherein the control unit drives the motor at a constant speed in the last read pixel, and
when the read position reaches the stop position, the control unit stops driving the motor.

5. The reading apparatus according to claim 4, wherein the control unit sets a pixel, which is ahead of a pixel when the motor is decelerated along the control target curve to the constant speed, as the last read pixel.

6. The reading apparatus according to claim 1, wherein the movement mechanism moves a document to perform reading while moving the document with respect to the stationary image sensor.

7. The reading apparatus according to claim 6, further comprising a printing unit capable of printing an image of the read document.

8. The reading apparatus according to claim 1, wherein the movement mechanism moves a carriage configured to hold the image sensor to perform reading while moving the image sensor with respect to a stationary document.

9. A control method for reading a document while relatively moving between a document and an image sensor by using a motor, the control method comprising:
continuing reading the document while decelerating the motor when a read-suspension event occurs during the reading;
stopping driving the motor when a read position by the image sensor reaches a stop position set within a last read pixel of a document; and
after the stop, driving the motor again in a same direction without being reversed, to resume the reading with a pixel next to the last read pixel.

* * * * *